(12) United States Patent
Fowler et al.

(10) Patent No.: US 10,071,758 B2
(45) Date of Patent: Sep. 11, 2018

(54) LOAD TRANSPORTING APPARATUS

(71) Applicant: M-Mover Holdings Limited, Ashbourne, Derbyshire (GB)

(72) Inventors: Jason Derrick Fowler, Hereford and Worcester (GB); Sam Matthew Dance, Nottinghamshire (GB); Andrew John Owen, Staffordshire (GB)

(73) Assignee: M-MOVER HOLDINGS LIMITED, Ashbourne, Derbyshire (GB)

( * ) Notice: Subject to any disclaimer, the term of this patent is extended or adjusted under 35 U.S.C. 154(b) by 0 days.

(21) Appl. No.: 14/894,099

(22) PCT Filed: May 20, 2014

(86) PCT No.: PCT/GB2014/051534
§ 371 (c)(1),
(2) Date: Nov. 25, 2015

(87) PCT Pub. No.: WO2014/195674
PCT Pub. Date: Dec. 11, 2014

(65) Prior Publication Data
US 2016/0101794 A1    Apr. 14, 2016

(30) Foreign Application Priority Data

Jun. 7, 2013    (GB) .................................. 1310178.7

(51) Int. Cl.
*B62B 3/12*    (2006.01)
*B62B 5/00*    (2006.01)
(Continued)

(52) U.S. Cl.
CPC ............ *B62B 3/12* (2013.01); *B60B 33/0049* (2013.01); *B62B 3/00* (2013.01); *B62B 3/02* (2013.01);
(Continued)

(58) Field of Classification Search
CPC .......... B62B 3/12; B62B 3/1404; B62B 3/04; B62B 3/00; B62B 3/02; B62B 5/0006;
(Continued)

(56) References Cited

U.S. PATENT DOCUMENTS 4,096,920 A  *  6/1978  Heyn .................... B62D 51/02
                                                    180/11
5,403,024 A      4/1995  Frketic
(Continued)

FOREIGN PATENT DOCUMENTS

FR    2875207    3/2006
GB    2260116    4/1993
(Continued)

OTHER PUBLICATIONS

PCT/GB2014/051534, International Search Report, dated Nov. 5, 2014, 5 pages.
GB1310178.7, Search Report dated Nov. 20, 2013.

*Primary Examiner* — Christopher M Koehler
*Assistant Examiner* — Joel Crandall
(74) *Attorney, Agent, or Firm* — Boyle Fredrickson, S.C.

(57) ABSTRACT

A load transporting apparatus is described including:
a main body;
a ground engaging wheel positioned at or towards one end of the main body and supported for rotation about a generally horizontal axis;
a support member, which is connected to the main body, and which supports a pair of wheel assemblies, each assembly including a wheel which is supported for rotation about a generally horizontal wheel axis, wherein said wheel assembly permits the wheel to swivel about a swivel axis which is substantially perpendicular to the wheel axis and off-set therefrom;
(Continued)

wherein the support member is connected to the main body by connection means which permits movement of the main body towards and away from the support member.

Also described is an apparatus where the or a further connection means is configured to permit rotation of the support member relative to the main body about an axis which extends generally in a fore-aft direction of the apparatus.

19 Claims, 15 Drawing Sheets

(51) Int. Cl.
| | | |
|---|---|---|
| *B66F 9/075* | (2006.01) | |
| *B66F 9/18* | (2006.01) | |
| *B62B 3/00* | (2006.01) | |
| *B62B 3/02* | (2006.01) | |
| *B66F 9/065* | (2006.01) | |
| *B60B 33/00* | (2006.01) | |
| *B60B 33/06* | (2006.01) | |

(52) U.S. Cl.
CPC .......... *B62B 5/0033* (2013.01); *B62B 5/0079* (2013.01); *B66F 9/065* (2013.01); *B66F 9/07586* (2013.01); *B66F 9/18* (2013.01); *B60B 33/0042* (2013.01); *B60B 33/0073* (2013.01); *B60B 33/06* (2013.01); *B62B 2203/10* (2013.01); *B62B 2206/06* (2013.01); *B62B 2301/04* (2013.01); *B62B 2301/14* (2013.01); *B62B 2301/23* (2013.01)

(58) Field of Classification Search
CPC . B62B 5/0079; B62B 5/0033; B62B 2301/04; B62B 2301/14; B62B 2301/23; B62B 2206/06; B62B 2203/10; B62D 51/04; B60B 33/0049; B60B 33/0068; B60B 33/0073; B60B 33/0076; B60B 33/0065; B60B 33/006; B60B 33/045; B60B 33/06; B60B 33/0042; B62F 9/065; B62F 9/07586

See application file for complete search history.

(56) References Cited

U.S. PATENT DOCUMENTS

| | | | |
|---|---|---|---|
| 5,791,669 A * | 8/1998 | Broddon | B62B 3/12 |
| | | | 280/33.992 |
| 5,871,218 A * | 2/1999 | Lepage | B62B 3/1492 |
| | | | 280/124.111 |
| 6,145,855 A | 11/2000 | Bellis, Jr. | |
| 6,659,565 B2 * | 12/2003 | Brant | B62B 1/24 |
| | | | 298/1 A |
| 7,134,515 B2 * | 11/2006 | Lenkman | B62D 51/04 |
| | | | 180/11 |
| 2006/0024150 A1 | 2/2006 | Gregory | |
| 2007/0131437 A1 | 6/2007 | Sewell | |
| 2008/0147281 A1* | 6/2008 | Ishii | B62D 51/005 |
| | | | 701/49 |
| 2009/0038864 A1* | 2/2009 | Yun | B62B 1/045 |
| | | | 180/19.1 |
| 2011/0121541 A1* | 5/2011 | Yamano | B60D 1/00 |
| | | | 280/515 |

FOREIGN PATENT DOCUMENTS

| | | |
|---|---|---|
| GB | 2276864 | 10/1994 |
| GB | 2372970 | 9/2002 |
| GB | 2436712 | 10/2007 |
| GB | 2506142 | 3/2014 |

\* cited by examiner

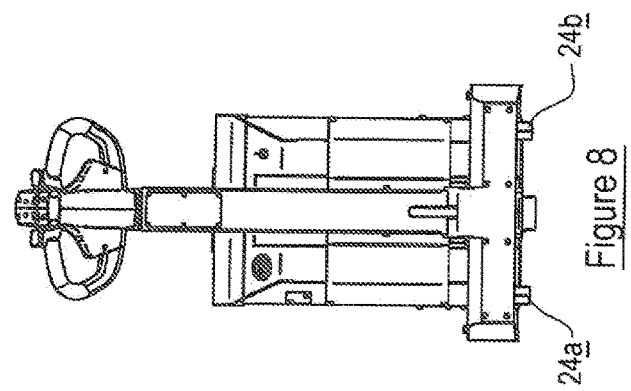
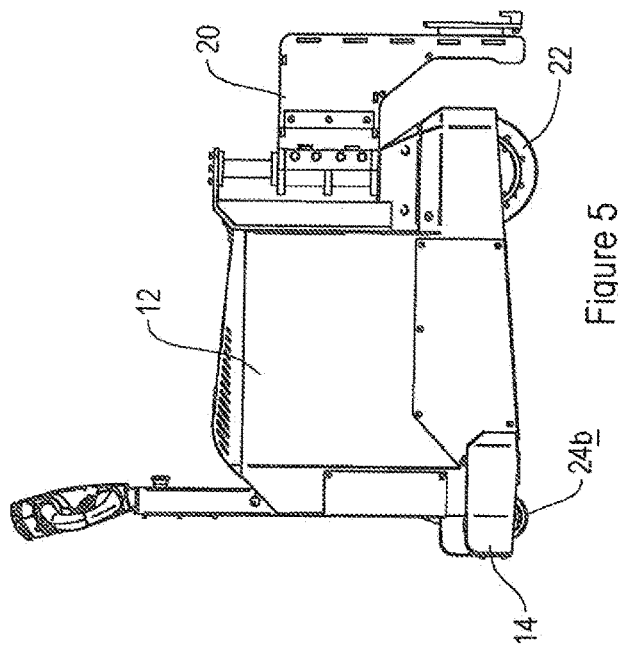
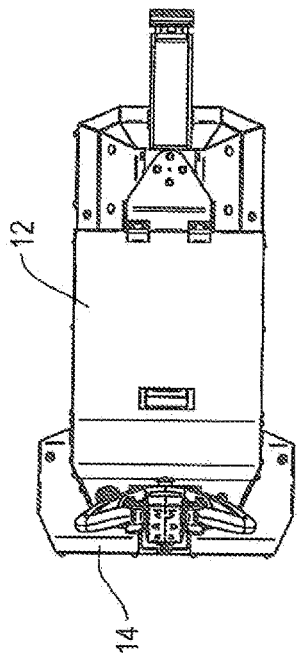
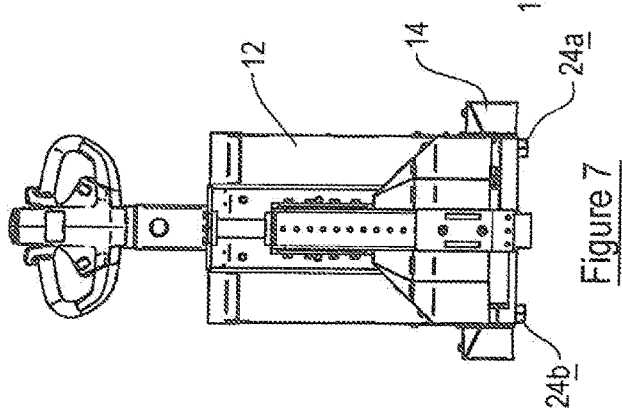

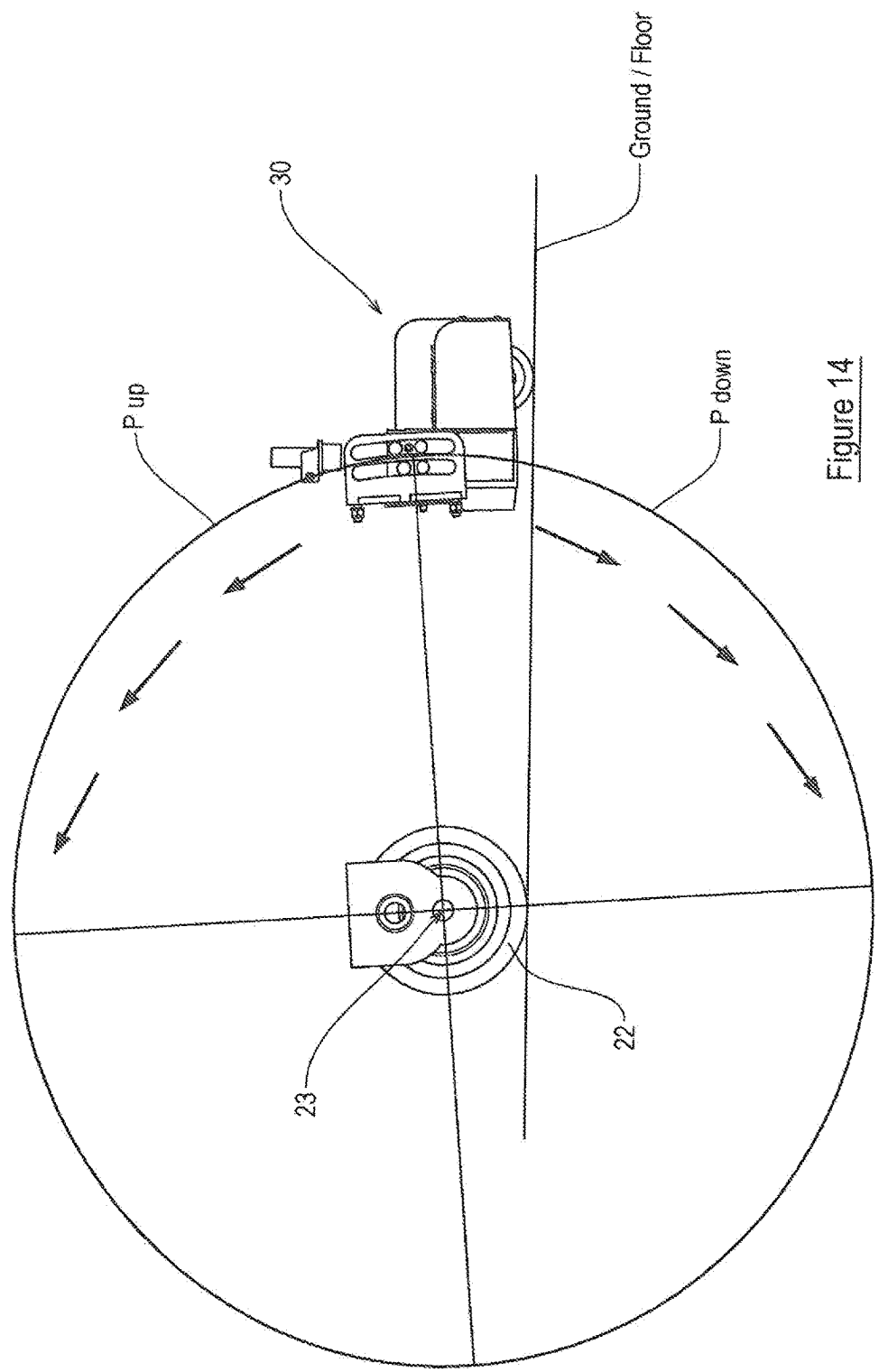

LOAD TRANSPORTING APPARATUS

BACKGROUND AND SUMMARY OF THE INVENTION

This invention relates to a load transporting apparatus. Such apparatus are used to push or pull heavy loads over a ground surface and typically include ground engaging wheels which are driven by a motor to effect said movement. In order to ensure efficient drive, it is desirable to transmit some of the weight of the load to be moved on to the ground engaging wheels, to ensure a good grip with the ground surface during movement.

One prior art such apparatus includes a three wheels which are supported for rotation relative to a main body. One of the wheels, which is positioned generally centrally of the main body and towards a front end thereof, is driven to rotate about a fixed axis by a motor which is supported by the main body. The remaining two wheels are a pair of castor wheel assemblies which are positioned one generally towards each side of the main body and at an opposite, rear, end of the main body. The three wheels therefore provide a tripod of wheels which support the main body as it transports a load. The apparatus includes a handle/control which serves to provide a user graspable handle to control the direction in which the apparatus moves. The handle includes controls for controlling the speed of rotation of the front wheel.

In order to provide a connection to the load to be transported, the front end of the main body is provided with a lifting device, having a coupling which is moveable in a generally vertical plane and is adapted to engage and bear the load to be transported. Such a lifting device may be manually moveable in the vertical plane, but may be moveable by means of an appropriate drive mechanism, e.g. a hydraulic piston/cylinder arrangement.

One problem with such devices is that when they are engaged with a load to be moved, especially a heavy load, one or both of the rear castor wheels are lifted from engagement with the floor surface. This can provide the user with difficulties in manoeuvring the apparatus, and thus the load. In addition, the rear castor wheel(s) being displaced from the floor surface can give rise to safety concerns, as it is possible for a user's foot to be positioned beneath the wheel, which could then become trapped if the lilting device fail or the coupling to the load failed.

It is an object of the present invention to address these issues.

According to a first aspect of the invention we provide a load transporting apparatus including:
 a main body;
 a ground engaging wheel positioned at or towards one end of the main body and supported for rotation about a generally horizontal axis;
 a support member, which is connected to the main body, and which supports a pair of wheel assemblies, each assembly including a wheel which is supported for rotation about a generally horizontal wheel axis, wherein said wheel assembly permits the wheel to swivel about a swivel axis which is substantially perpendicular to the wheel axis and off-set therefrom;
 wherein the support member is connected to the main body by connection means which permits movement of the main body towards and away from the support member.

According to a second aspect of the invention we provide a load transporting apparatus including:
 a main body;
 a ground engaging wheel positioned at or towards one end of the main body and supported for rotation about a generally horizontal axis;
 a support member, which is connected to the main body, and which supports a pair of wheel assemblies, each assembly including a wheel which is supported for rotation about a generally horizontal wheel axis, wherein said wheel assembly permits the wheel to swivel about a swivel axis which is substantially perpendicular to the wheel axis and off-set therefrom;
 wherein the support member is connected to the main body by connection means which is configured to permit rotation of the support member relative to the main body about an axis which extends generally in a fore-aft direction of the apparatus.

Thus, in the second aspect of the invention the or a further connection means is configured to permit rotation of the support member relative to the main body about an axis which extends generally in a fore-aft direction of the apparatus.

Further features of the first and second aspects of the invention are set out in the claims appended hereto.

According to a third aspect of the invention we provide an apparatus according to the first aspect of the invention including any one of the features of the second aspect of the invention.

According to a fourth aspect of the invention we provide an apparatus according to the second aspect of the invention including any one of the features of the first aspect of the invention.

BRIEF DESCRIPTION OF THE DRAWINGS

Embodiments of the aspects of the invention will now be described by way of examples only with reference to the following drawings, of which:

FIG. 5 is a side view of the apparatus of FIG. 1;

FIG. 6 is a plan view of the apparatus of FIG. 1;

FIG. 7 is a front view of the apparatus of FIG. 1;

FIG. 8 is a rear view of the apparatus of FIG. 1;

FIG. 14 is a side view illustrating the range of movement of the connection means of the apparatus;

DETAILED DESCRIPTION

Figure 1:
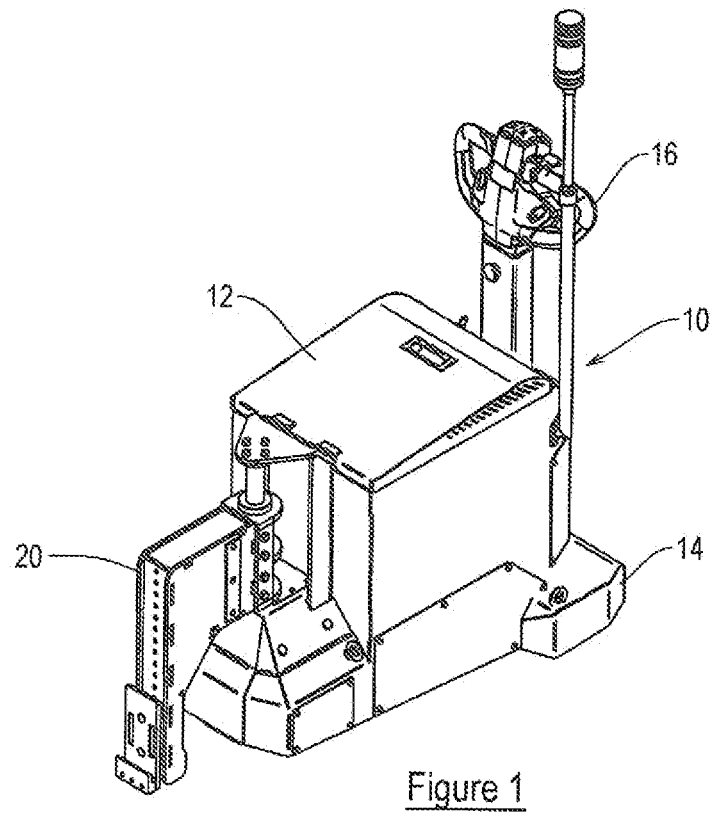
FIG. 1 is a perspective view of an apparatus according to the present invention.
Figure 2:
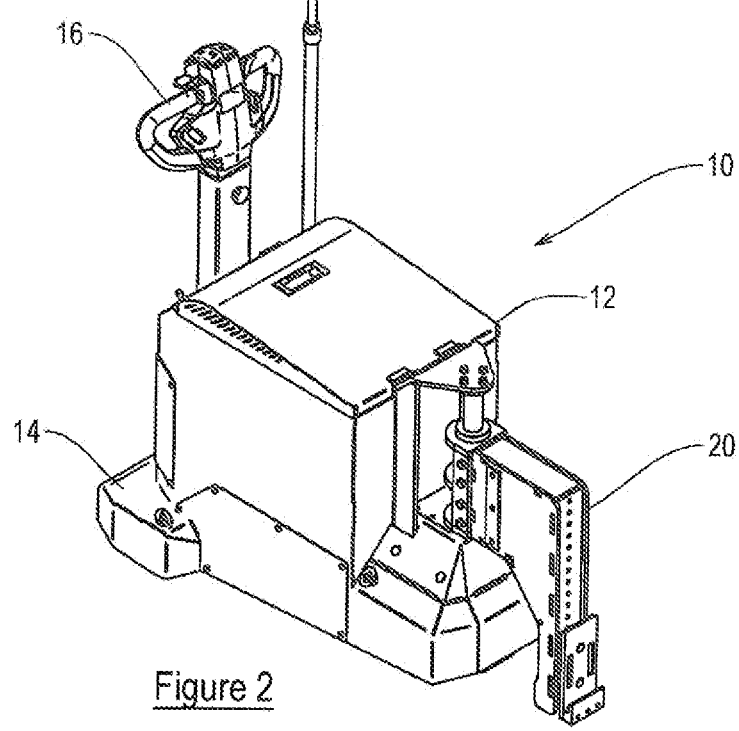
FIG. 2 is a further perspective view of the apparatus of FIG. 1.
Figure 3:
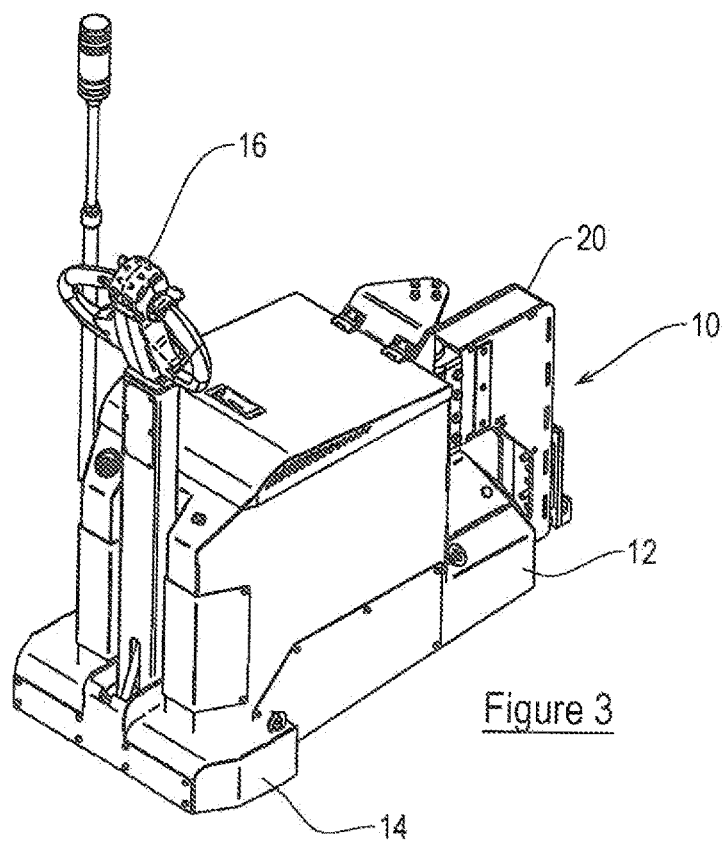
FIG. 3 is a further perspective view of the apparatus of FIG. 1.
Figure 4:
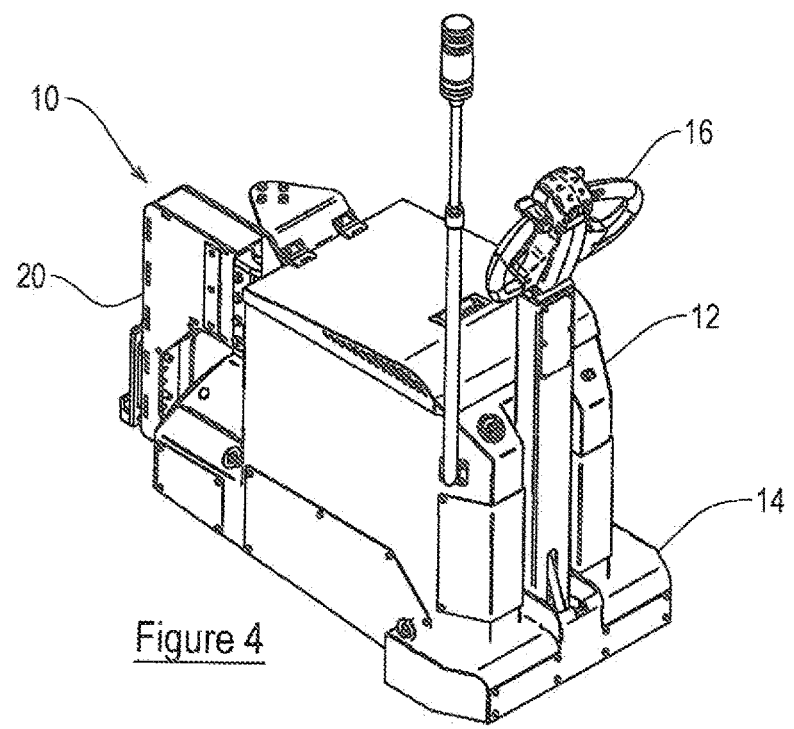
FIG. 4 is a further perspective view of the apparatus of FIG. 1.

Referring to the figures, these show a load transporting apparatus in accordance with the present invention. The apparatus 10 includes a main body 12 which houses the internal working components of the machine, e.g. motor, drive assembly. Connected to the main body 12 is a ground engaging wheel 22 which is positioned towards the front end of the main body 12 and supported for rotation about a generally horizontal axis (not shown) which is a fixed axle.

A rear end of the main body 12 is connected to a support member 14 which supports a pair of wheel assemblies. The wheel assemblies are positioned spaced from each other generally at opposite lateral ends of the support member, which each assembly including a wheel 24a, 24b which is supported for rotation about a generally horizontal wheel axis. Each wheel assembly is what is commonly known as a castor wheel, which therefore permits the wheel 24a, 24b to swivel about a swivel axis which is substantially perpendicular to the wheel axis and offset therefrom.

The apparatus 10 includes a handle/control 16 which serves to provide a user graspable handle to control the direction in which the apparatus 10 moves. The handle 16 includes controls for controlling the speed of rotation of the ground engaging wheel 22, which is driven by an appropriate motor situated within the main body 12. The handle is pivotally connected at its lower end to the support member 14.

A front end of the main body 12 supports a lifting device 20 which is movable upwardly/downwardly in a generally vertical plane. The lifting device 20 is provided with a hook formation 20h to engage a corresponding formation Lh of a load L to be transported. In the present example the lifting device 20 is a fabricated metal structure which is supported on a hydraulic ram which effects its vertical movement. The lifting device 20 can also pivot about the same vertical axis. FIGS. 15 through 18 show the vertical 17 and pivotal 18a, 18b movement paths of the lifting device 20.

Figure 9:
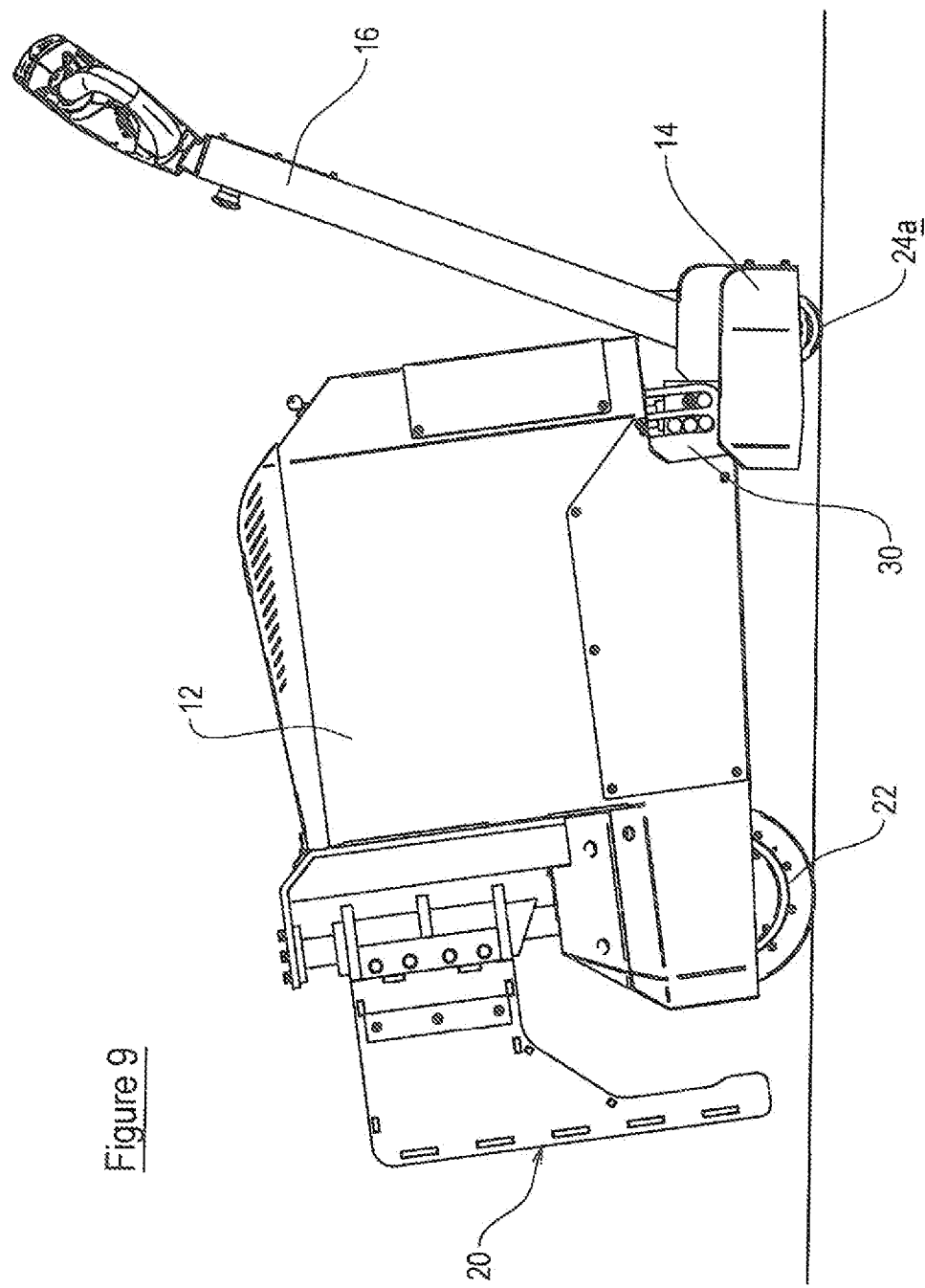
FIG. 9 is a side view of the apparatus with a front end thereof loaded.
Figure 10:
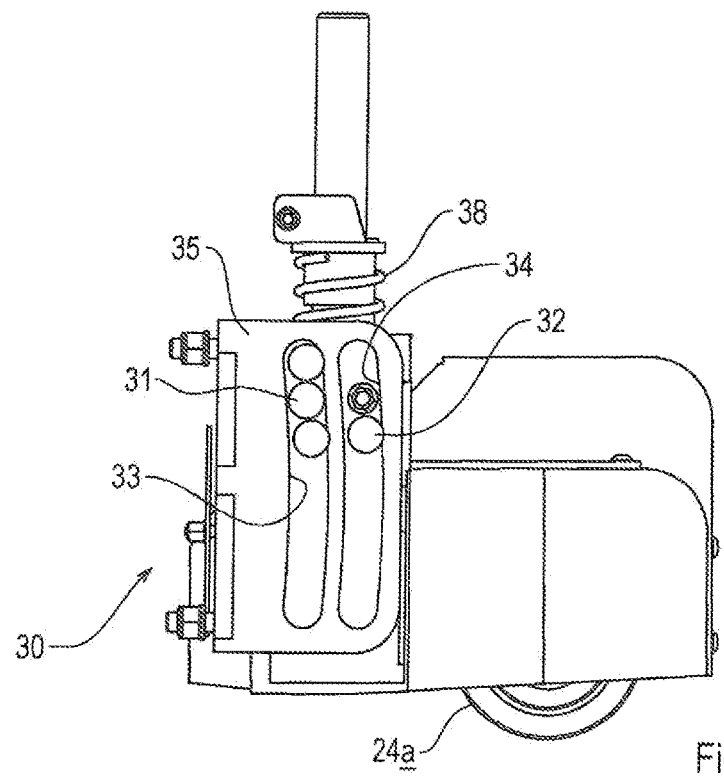
FIG. 10 is a side view of a connection means of the apparatus.
Figure 11:
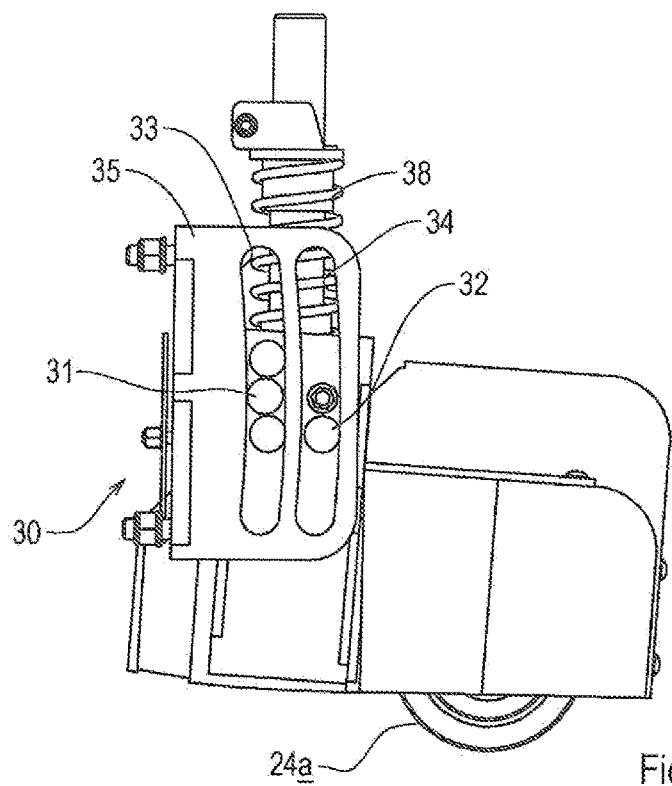
FIG. 11 is a further side view of the connection means of FIG. 10.
Figure 12:
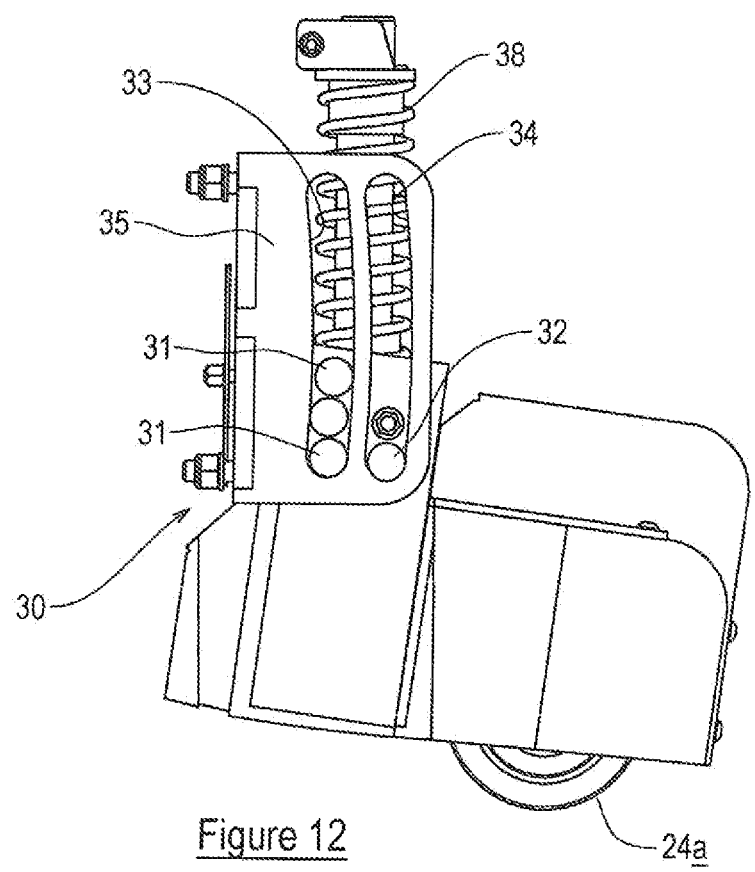
FIG. 12 is a further side view of the connection means of FIG. 10.

In accordance with the present invention the support member 14 is connected to the main body 12 by a connection mechanism 30 which permits movement of the main body 12 towards and away from the support member 14. This general movement is shown in FIG. 9 as compared with FIG. 5. As discussed in more detail later, the apparatus 10 includes a biasing mechanism, e.g. a spring 38 (see FIG. 13) for biasing the main body 12 away from the support member 14. Advantageously, as will be apparent from the following description, the connection mechanism 30 is configured such that the swivel axes of the wheel assemblies are maintained substantially vertical as the main body 12 moves towards and away from the support member 22. This connection mechanism 30 ensures that main body 12 can pivot forwardly the axis of rotation of the wheel 22 as shown representatively in FIG. 14. The connection mechanism 30 has the significant advantage of ensuring that, under normal working conditions, all three of the wheels, 22, 24a, 24b maintain ground engaging contact even when the lifting device 20 is fully engaged with a load to be transported.

Referring in more detail to FIGS. 10 through 14, these show in detail the connection mechanism 30 providing the connection between the main body 12 and the support member 14. This connection mechanism 30 ensures that the swivel axes of the wheel assemblies are maintained substantially vertical during the movement of the main body 12 away from and towards the support member 12, which ensures that the castor wheels 24a, 24b are free to swivel about their respective swivel axes in all in use conditions, i.e. whether the relative spacing between the main body 12 and the support member 14 is that shown in FIGS. 5/13b or in FIG. 9/13a.

The maintenance of the swivel axes is achieved by virtue of the connection means 30 which is configured to cause the main body to follow an arcuate path as it moves towards and away from the support member 14. In the present embodiment a set of arcuate guides 33, 34 are provided on a fabricated part 38 which is connected to the main body 12. Slidably movable along the arcuate guides are a plurality of cylindrical guide members 31, 32. There are two cylindrical guide members 31, 32 positioned in each of the four guide channels 33, 34. The guide members 31, 32 are rotationally supported on/relative to the support member 14, which means that any relative movement between the main body 12 and the support member 14 is substantially an arcuate movement.

The arcuate guide/channels 33, 34 are configured such that they follow a portion of the circumference of a circle, with its centre being substantially coinciding with or near the axis of the wheel 22.

Figure 13A:
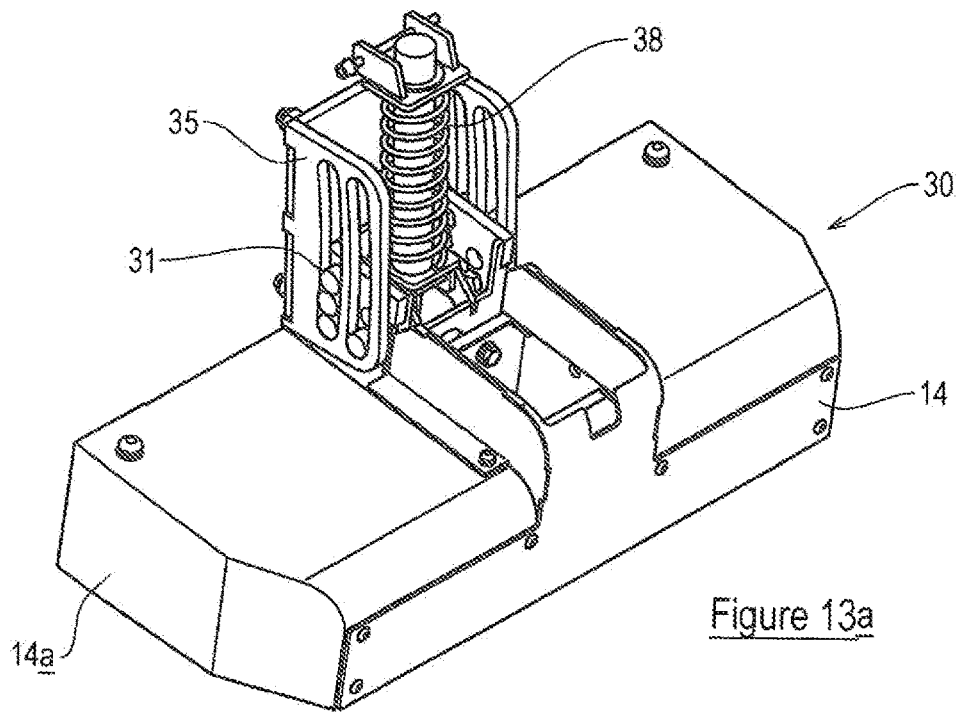
FIG. 13a is a perspective view of the connection means of the apparatus and its connection to a support member, with the connection means shown in an extended condition.
Figure 13B:
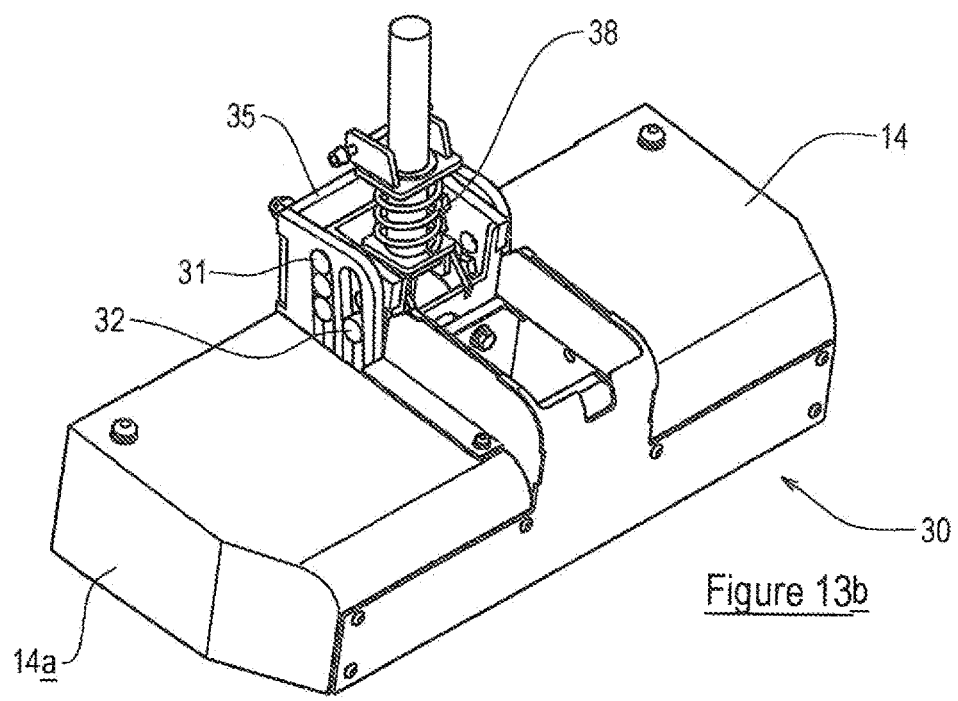
FIG. 13b is a perspective view of the connection means of the apparatus and its connection to a support member, with the connection means shown in a compressed condition.
Figures 15, 16:
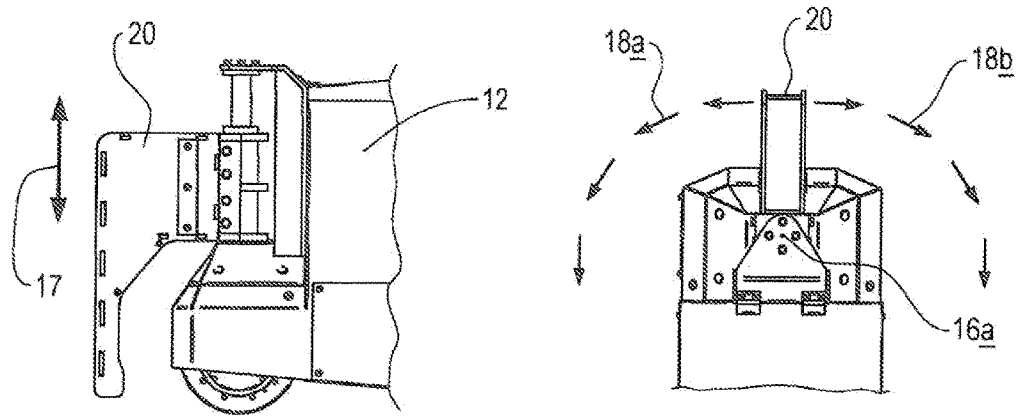
FIG. 15 is a side view of a lifting device positioned at a front end of the apparatus.
FIG. 16 is a plan view of the lifting device of the apparatus.
Figure 17:
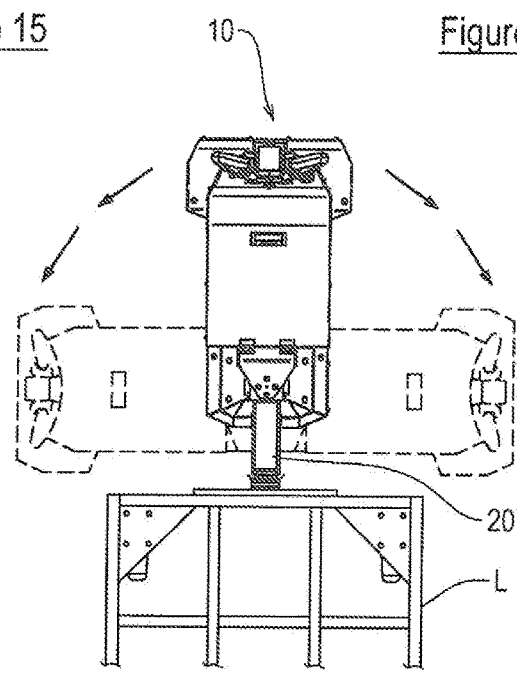
FIG. 17 is a plan view of the apparatus connected to a load to be transported.
Figure 18:
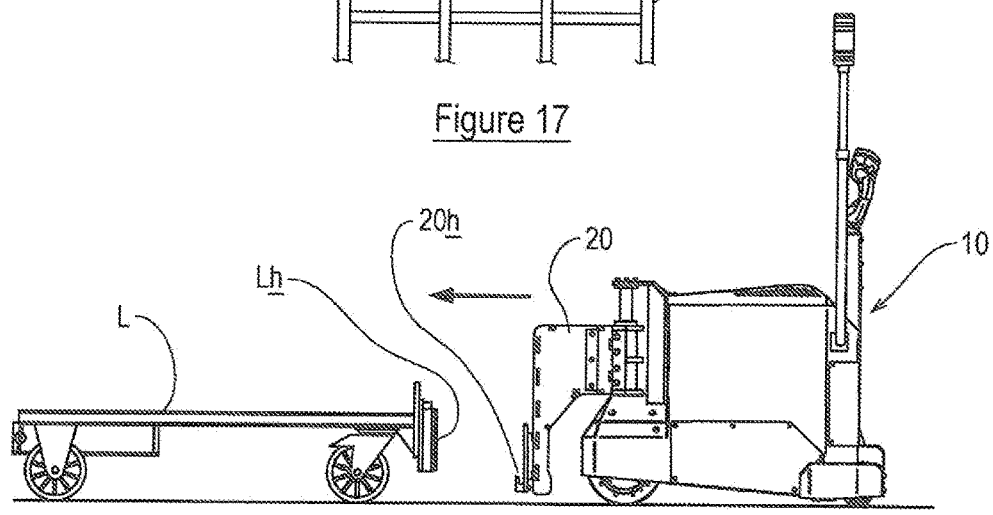
FIG. 18 is a side view of the apparatus prior to engagement with a load to be transported.
Figure 19:
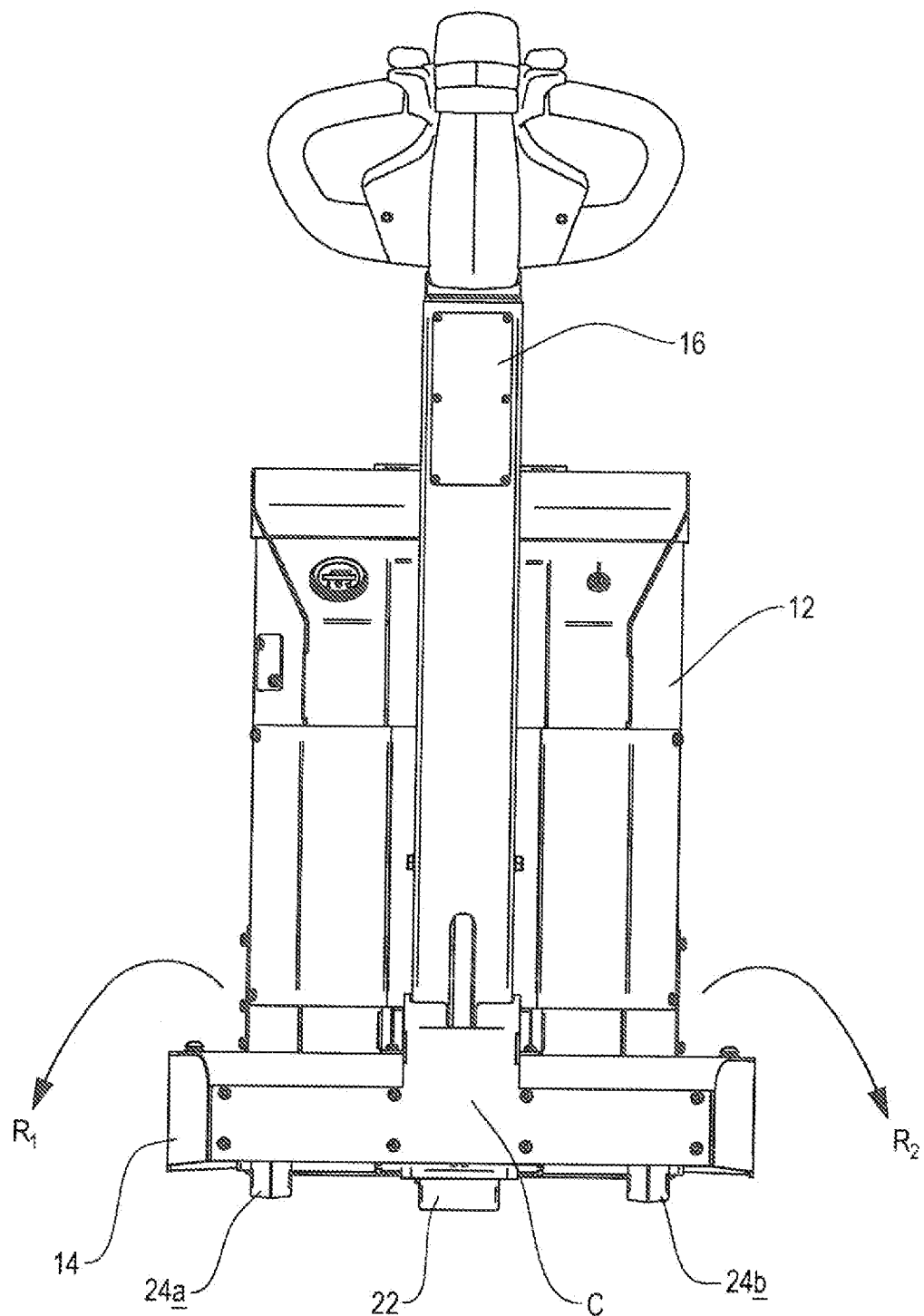
FIG. 19 is a rear view of the apparatus illustrating the second aspect of the invention.
Figure 20:
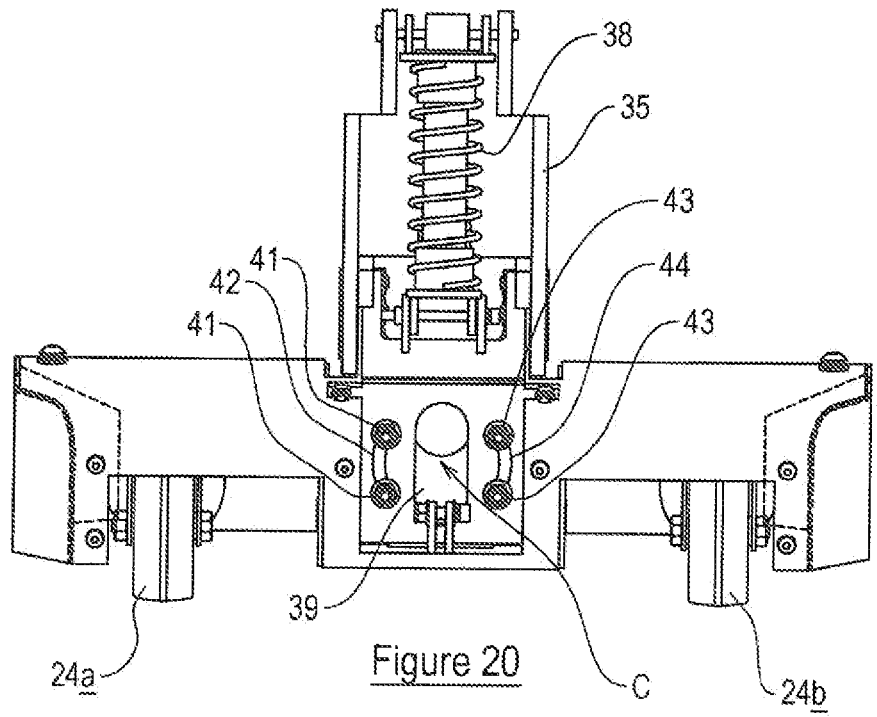
FIG. 20 is a rear view of the support member illustrating the connection means in accordance with the second aspect of the invention.

As shown most clearly in FIG. 13 the connection mechanism includes a biasing mechanism in this case a spring 38 supported on a projecting part, which biases the main body 12 away from the support member 14. The biasing mechanism may include a damper.

It should be appreciated that other forms of biasing means can be used in place of the spring mechanism 38. All that is required is that the biasing means urges the main body 12 away from the support member 14, thus causing the guide members 31, 32 to be biased towards a lower most end of the guide/channels 33, 34 (see FIG. 13b).

As mentioned previously, FIG. 9 shows a representative view of the arcuate movement of the guide members 31, 32 in the channels 33, 34. In this figure the arc $P_{up}$ is used to designate movement of the main body 12 away from the support member 14, whereas the arcuate path $P_{down}$ is used to represent arcuate movement of the main body 12 towards the support member 14.

As mentioned previously, the inventive connection mechanism 30 of the present invention ensures that when the front end lifting device 20 is loaded, the rear wheels 24a, 24b are maintained in ground engaging contact. This ensures that a user can more safely steer and control the apparatus 10. FIG. 9 shows the configuration of the apparatus 10 where the lifting device 20 has been loaded (although the load is not shown). It can be seen that the wheels 22, 24a and 24b are in ground engaging contact. However, by virtue of the load applied to the lifting device 20, the main body 12 has pivoted arcuately away from the support member 14 by virtue of the connection mechanism 30. However, the biasing mechanism 38 has ensured that the wheels 24a, 24b are maintained in engagement with the ground surface.

As shown in the figures, the support member 14 includes a cover or skirt 14a which extends downwardly towards the ground surface and over the wheel assemblies 24a, 24b. This cover/skirt 14a prevents or at least inhibits a user's feet from becoming trapped underneath the apparatus 10 at the rear end of the device.

Whilst in the present embodiment it is the arcuate guides/channels 33, 34 which are provided on the main body 12 and the rotating guide members 31, 32 which are provided on the support member 14, it should be appreciated that the relative position of these components parts could be reversed. For example, the arcuate guides 33, 34 could be provided on or connected to the support member 14, whilst the rotatable guide members 31, 32 could be provided on or connected to the main body 12.

In accordance with the second aspect of the present invention, we refer particularly to FIGS. 19 through 25. These show a further inventive feature of the apparatus 10 in which the connection mechanism 30 (or a separate connection mechanism which connects the mechanism 30 to the support member 14 or to the main body 12) is configured to permit rotation of the support member 14 relative to the main body 12 about an axis C which extends generally in a fore-aft direction of the apparatus 10. In this particular embodiment, the connection mechanism is configured to permit rotation of the support member 14 relative to the main body 12 about an axis which extends generally horizontally in the fore-aft direction of the apparatus 10, and particularly (although not necessary) the axis extends midway between the pair of wheel assemblies 24a, 24b and generally intersects a plane containing the ground engaging wheel 22.

Figure 21:
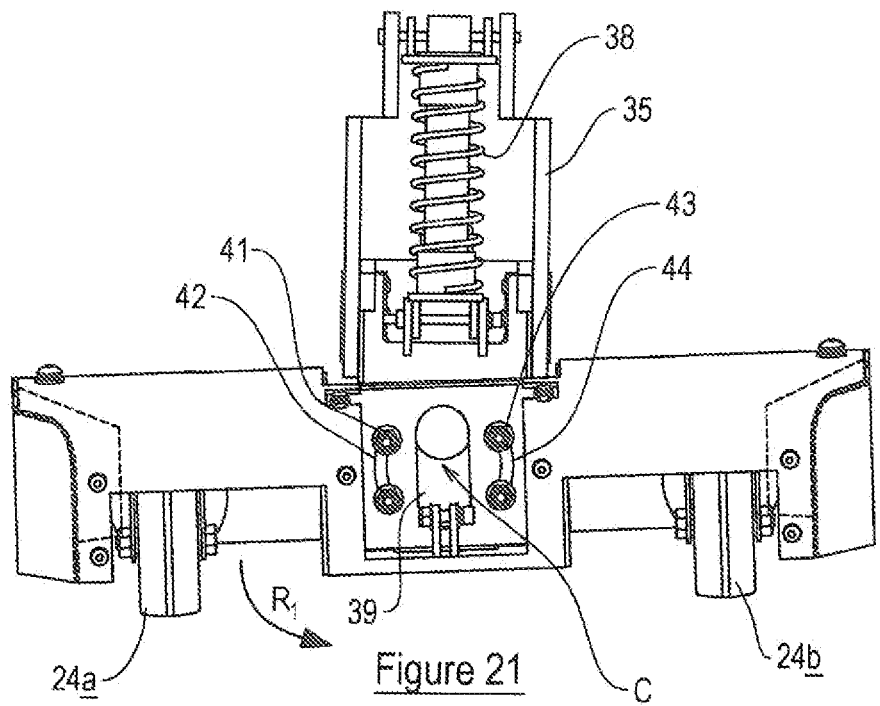
FIG. 21 is a rear view of the support member of FIG. 20 rotated in a first, R1, rotational direction.
Figure 22:
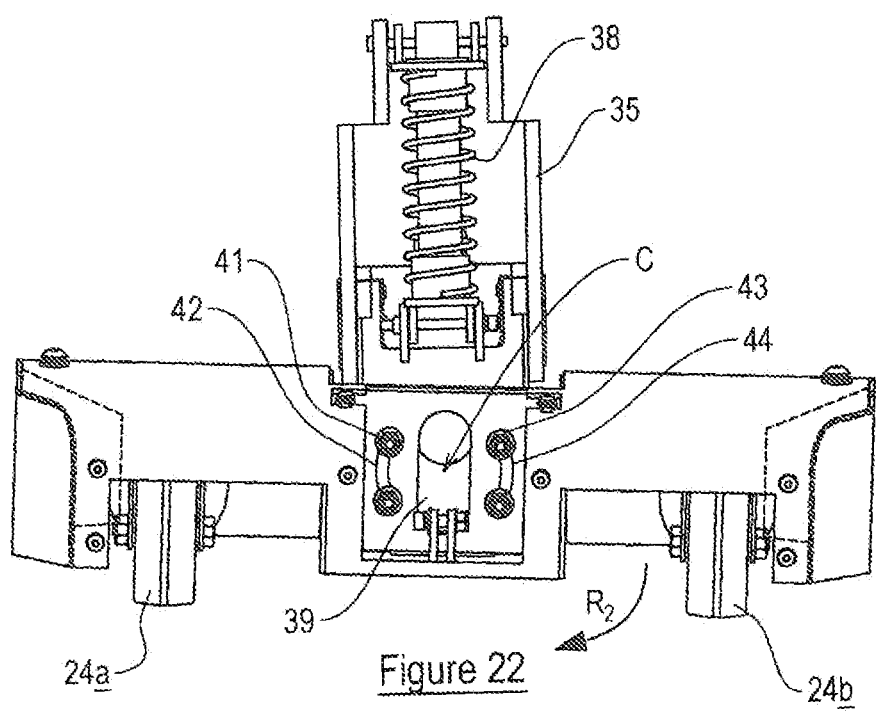
FIG. 22 is a rear view of the support member of FIG. 20 rotated in a second, R2, rotational direction.
Figure 23:
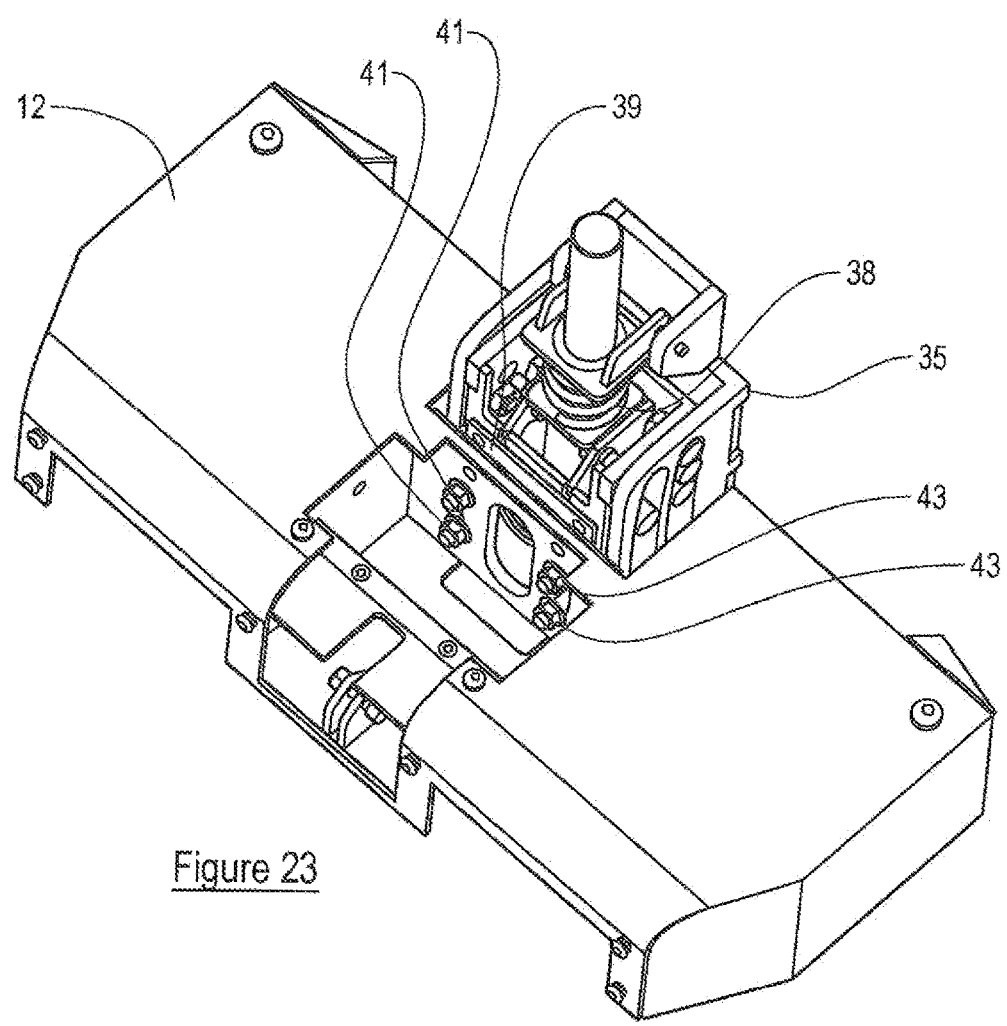
FIG. 23 is a perspective view of the support member of FIG. 20.
Figure 24:
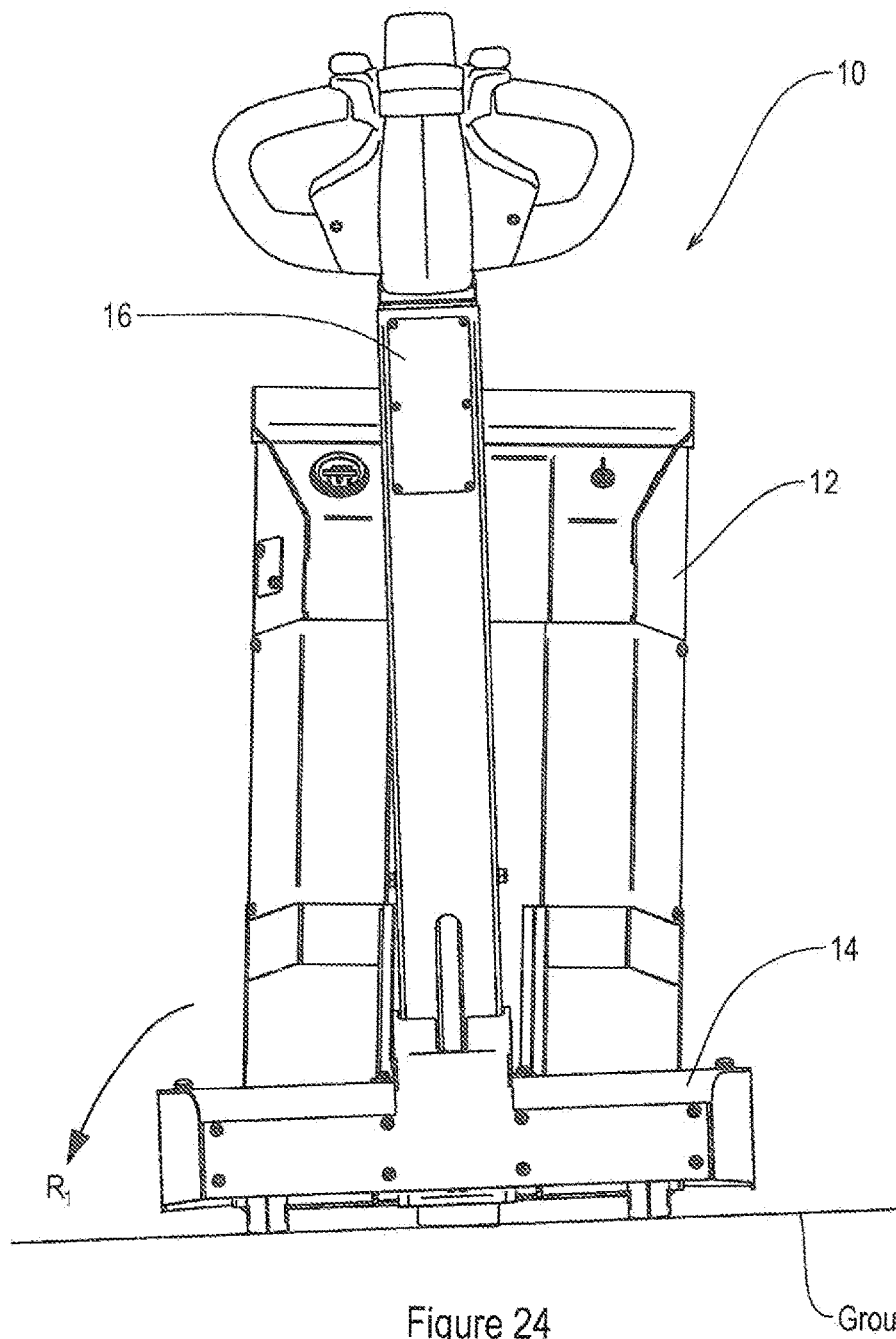
FIG. 24 is a rear view of the apparatus in accordance with the second aspect of the invention with the support member thereof rotated in the R1 rotational direction.

In more detail, the pivotal connection mechanism is provided by way of a pair of vertically oriented arcuate channels/apertures 42, 44 which are provided in a wall of the support member 14. Positioned with each channel 42, 44 is a pair of spaced projections 41, 43 which acts as guide members and slide along the channels 42, 44. The projections 41, 43 (which in the present example are threaded shanks) project rearwardly through the channels 42, 44 from a plate 39 which is connected indirectly to the main body 12. When the support member 14 is in its neutral position (see FIG. 20) the spacing of each of the like projections from each other is such that they sit space from the ends of their respective channels 42, 44. This spacing provides for a degree of rotational movement of the support member 14 relative to the main body 12, as illustrated in FIGS. 21 and 22. Connected to the end of each threaded shank 41, 43 is a nut and corresponding washer, with the washer having a larger diameter than the width of the channel 42, 44. Thus, when the nut is tightened, the washer prevents the support member 14 from becoming disconnected from the plate 39.

Figure 25:
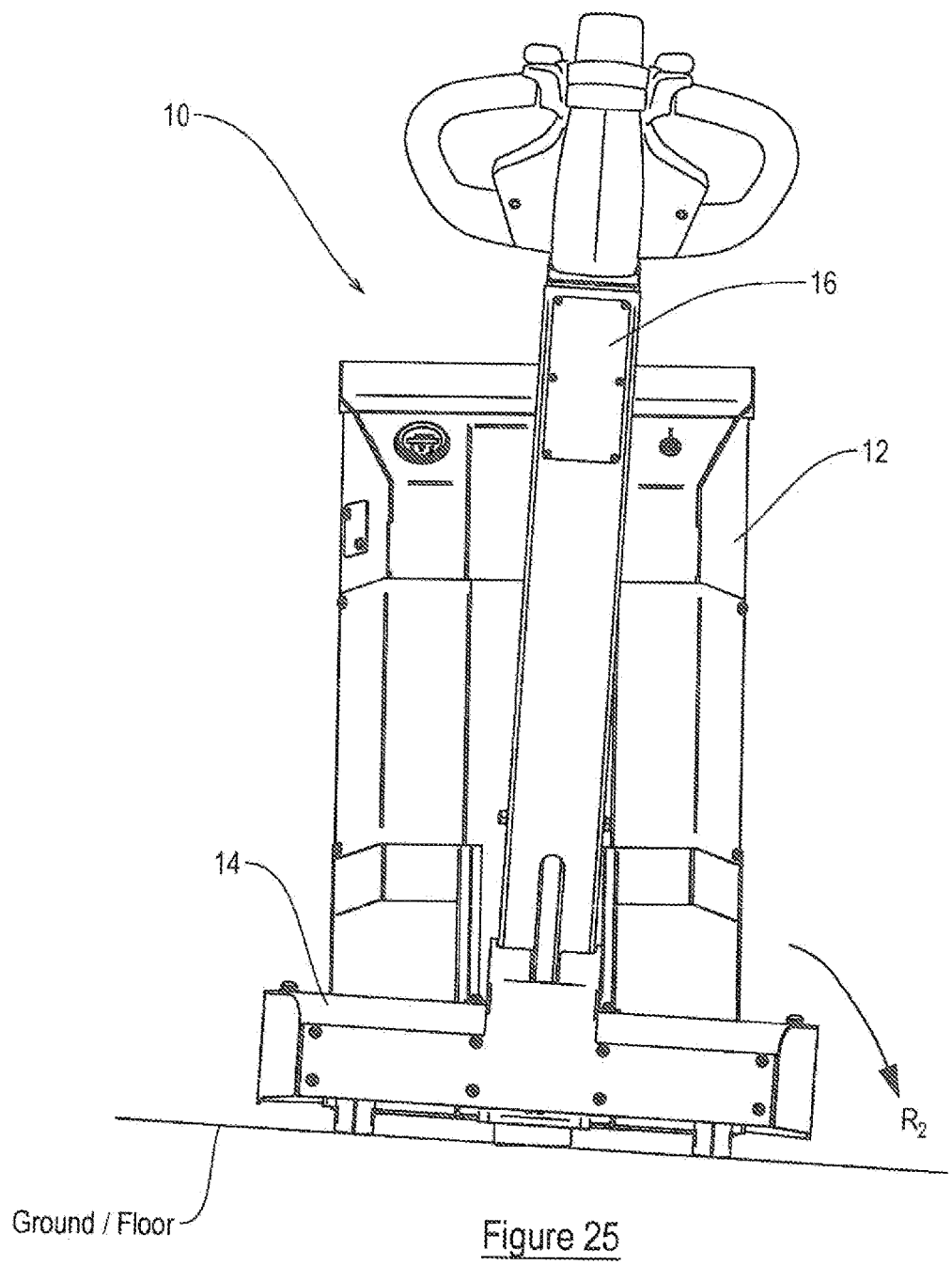
FIG. 25 is a rear view of the apparatus in accordance with the second aspect of the invention with the support member thereof rotated in the R2 rotational direction.

The connection mechanism therefore permits the support member 14 to rotate about the axis C in the rotational directions $R_1$ (see FIGS. 21 and 24) and $R_2$ (see FIGS. 22 and 25). The connection mechanism which affords the rotational movement of the support member 14 may also be provided with a biasing means/mechanism for biasing the support member 14 towards a neutral position. For example, the neutral position may be where the ground engaging surfaces of all three wheels 22, 24a, 24b are substantially in the same plane (see FIG. 20), in other words, the neutral position may be that which the wheels 22, 24a, 24b would naturally adopt when the apparatus 10 is positioned on a flat surface.

This pivoting/rotational movement of the support member 14 relative to the main body 12 ensures that under most operating conditions, all three wheels of the apparatus 10 are engaged with the ground surface, irrespective of whether the ground surface is even. This permits a user a greater control of the apparatus 10 and also reduces the likelihood of a user's feet becoming trapped under the support member 14.

Whilst in the present embodiment the apparatus 10 includes the arcuate connection mechanism 30 and the connection mechanism which allows pivoting about the axis C, it should be appreciated that apparatuses could be provided with one or other of these inventive connection means or both of them.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A load transporting apparatus including:
   a main body having a front end, which supports a lifting device and an opposite, rear, end;
   a front ground engaging wheel positioned toward the front end of the main body and supported for rotation about a generally horizontal axis;
   a support member, which is connected to the main body at the rear end of the main body, and which supports a pair of rear wheel assemblies, each rear wheel assembly including a castor wheel which is supported for rotation about a generally horizontal rear wheel axis, wherein each rear wheel assembly permits the castor wheel to swivel, relative to the main body, about a swivel axis which is substantially perpendicular to the rear wheel axis and off-set therefrom;
   wherein the support member is connected to the rear end of the main body by a movable connection which is configured and arranged to permit movement of the rear end of the main body away from the support member to a raised position in which the rear end of the main body is elevated relative to the support member, and toward the support member to a lowered position in which the rear end of the main body is lowered relative to the support member, wherein during movement of the main body between the raised and lowered positions the front ground engaging wheel is maintained in ground engaging contact and the main body pivots about the generally horizontal axis of the front around engaging wheel, and wherein the castor wheels of the rear wheel assemblies are maintained in ground engaging contact during movement of the main body between the raised and lowered positions.

2. The load transporting apparatus of claim 1 including biasing means for biasing the rear end of the main body away from the support member, or including drive means for effecting rotation of the ground engaging wheel about its rotational axis.

3. The load transporting apparatus of claim 1 wherein the movable connection is further configured and arranged such that the swivel axes of the wheel assemblies are maintained substantially vertical as the main body moves towards and away from the support member.

4. The load transporting apparatus of claim 1 wherein the movable connection is configured to cause the main body to follow an arcuate path as it moves towards and away from the support member.

5. The load transporting apparatus of claim 4 wherein said arcuate path is a portion of a circumference of a circle, with its centre being substantially coinciding with or near the axis of rotation of the front ground engaging wheel of the main body.

6. The load transporting apparatus of claim 1 wherein said connection includes at least one arcuate guide along which a guide member is moveable, or the connection includes a pair of arcuate guides and each having a respective guide member moveable therealong.

7. The load transporting apparatus of claim 6 wherein one of the arcuate guide or guide member is connected to the support member and the other of the arcuate guide or guide member is connected to the main body.

8. The load transporting apparatus of claim 6 wherein two or more guide members are moveable along each arcuate guide, or wherein each guide member is rotatable about a respective axis, or wherein each guide member is cylindrical.

9. The load transporting apparatus of claim 6 and further including biasing means for biasing the rear end of the main body away from the support member, wherein the biasing means is positioned in between the pair of arcuate guides.

10. The load transporting apparatus of claim 1 including biasing means for biasing the rear end of the main body away from the support member, wherein the biasing means is connected at one end to the main body and at its opposite end to the support member, or wherein the biasing means includes a spring.

11. The load transporting apparatus of claim 1 including a lifting device connected to the main body and positioned towards the front end of the main body, the lifting device being moveable in a generally vertical plane and being adapted to engage and bear the load to be transported.

12. The load transporting apparatus of claim 1 wherein the connection is positioned substantially midway between the two castor wheel assemblies.

13. The load transporting apparatus of claim 1 wherein the support member includes a cover which extends downwardly towards the ground surface over the rear wheel assemblies.

14. A load transporting apparatus including:
a main body having a front end, which supports a lifting device, and an opposite, rear, end;
a front ground engaging wheel positioned toward the front end of the main body and supported for rotation about a generally horizontal axis;
a support member having a handle, wherein the support member is connected to the main body at the rear end of the main body, and wherein the support member includes a pair of rear wheel assemblies, each rear wheel assembly including a ground engaging castor wheel which is supported for rotation about a generally horizontal rear wheel axis, wherein each rear wheel assembly permits the castor wheel to swivel, relative to the main body, about a swivel axis which is substantially perpendicular to the rear wheel axis and off-set therefrom;
wherein the main body and the support member are movable in a fore-aft direction upon movement of the front ground engaging wheel and the rear ground engaging castor wheels along a ground surface;
wherein the support member is connected to the rear end of the main body by a pivot connection which is configured to permit rotation of the support member relative to the main body about a longitudinal axis which extends generally horizontally in the fore-aft direction while maintaining the rear castor wheels in engagement with the ground surface.

15. The load transporting apparatus of claim 14 wherein the pivot connection is configured such that the longitudinal axis extends midway between the pair of rear wheel assemblies and intersects a plane containing the front ground engaging wheel.

16. The load transporting apparatus of claim 14 further including biasing means for biasing the support member towards a neutral position about the longitudinal axis.

17. The load transporting apparatus of claim 16 wherein, in said neutral position, the ground engaging surfaces of all three wheels are substantially in the same plane.

18. The load transporting apparatus according to claim 14 wherein the pivot connection is positioned substantially midway between the two rear wheel assemblies.

19. The load transporting apparatus of claim 14 wherein the support member includes a cover which extends downwardly towards the ground surface over the rear wheel assemblies.

* * * * *

UNITED STATES PATENT AND TRADEMARK OFFICE
CERTIFICATE OF CORRECTION

PATENT NO. : 10,071,758 B2
APPLICATION NO. : 14/894099
DATED : September 11, 2018
INVENTOR(S) : Jason Derrick Fowler et al.

Page 1 of 1

It is certified that error appears in the above-identified patent and that said Letters Patent is hereby corrected as shown below:

In the Claims

Claim 1, Column 6, Line 44, delete the third occurrence of "wheel";

Claim 1, Column 6, Line 64, delete "around" and substitute therefore -- ground --;

Claim 10, Column 7, Line 42, after "member," delete "or".

Signed and Sealed this
Sixteenth Day of October, 2018

Andrei Iancu
*Director of the United States Patent and Trademark Office*